United States Patent [19]

Butter et al.

[11] Patent Number: 5,255,372
[45] Date of Patent: Oct. 19, 1993

[54] APPARATUS FOR EFFICIENTLY INTERCONNECING CHANNELS OF A MULTIPROCESSOR SYSTEM MULTIPLEXED VIA CHANNEL ADAPTERS

[75] Inventors: Adrian S. Butter, Binghamton; Howard E. Parsons, Endwell, both of N.Y.

[73] Assignee: International Business Machines Corporation, Armonk, N.Y.

[21] Appl. No.: 575,575

[22] Filed: Aug. 31, 1990

[51] Int. Cl.$^5$ .................. G06F 12/42; G06F 15/16
[52] U.S. Cl. .................................. 395/325; 395/275; 364/228; 364/241.9; 364/238; 364/240; 364/240.2; 364/DIG. 1
[58] Field of Search .................. 364/DIG. 1 MS File, 364/DIG. 2 MS File; 395/275, 325, 725, 775, 800, 200; 370/58.1

[56] References Cited

U.S. PATENT DOCUMENTS

| | | | |
|---|---|---|---|
| 3,597,743 | 8/1971 | Murphy et al. | 395/275 |
| 4,065,808 | 12/1977 | Schomberg et al. | 395/325 |
| 4,155,117 | 5/1979 | Mitchell et al. | 364/200 |
| 4,261,035 | 4/1981 | Raymond | 395/325 |
| 4,317,196 | 2/1982 | Ulug | 370/94.3 |
| 4,378,588 | 3/1983 | Katzman et al. | 364/200 |
| 4,418,382 | 11/1983 | Larson et at. | 364/200 |
| 4,420,806 | 12/1983 | Johnson et al. | 395/725 |
| 4,466,062 | 8/1984 | Krikor | 364/200 |
| 4,471,458 | 9/1984 | Weilbacker et al. | 364/900 |
| 4,495,564 | 1/1985 | Draper et al. | 395/275 |
| 4,495,570 | 1/1985 | Kitajima et al. | 395/650 |
| 4,604,694 | 8/1986 | Hough | 395/650 |
| 4,807,121 | 2/1989 | Halford | 364/200 |
| 4,814,980 | 3/1989 | Peterson et al. | 395/200 |
| 4,897,833 | 1/1990 | Kent | 370/85.2 |
| 4,922,410 | 5/1990 | Morikawa et al. | 395/275 |
| 5,067,123 | 11/1991 | Hyodo et al. | 370/58.1 |

FOREIGN PATENT DOCUMENTS

| | | |
|---|---|---|
| 0059838 | 9/1982 | European Pat. Off. |
| 0239324 | 9/1987 | European Pat. Off. |

OTHER PUBLICATIONS

EPO Search Report in 91111276.1.
"RSM (Receiver Selectable Multicast): A Communication Mechanism for Multiprocessors" by Amano, IEEE 1987.
IBM Technical Disclosure Bulletin, vol. 32, No. 4B, Sep. 1989 "Peer Packet Communication Computer Enhancement and Coexistence with Cycle-Steal channels".

Primary Examiner—Michael R. Fleming
Assistant Examiner—Gopal C. Ray
Attorney, Agent, or Firm—Pollock, Vande Sande & Priddy

[57] ABSTRACT

Apparatus for efficiently interconnecting OEMI channels of a multiprocessor facility. A plurality of channel adapters are connected to individual channels from a plurality of processors. A supervisory interrupt driven microprocessor receives a link request from a channel adapter when the channel adapter has determined that two logical adapters are in an appropriate architected state. The microprocessor will assign a data bus to channel adapters involved in a link request if certain criteria is met by said link requests, signifying an efficient transfer between said channel adapters is likely.

15 Claims, 10 Drawing Sheets

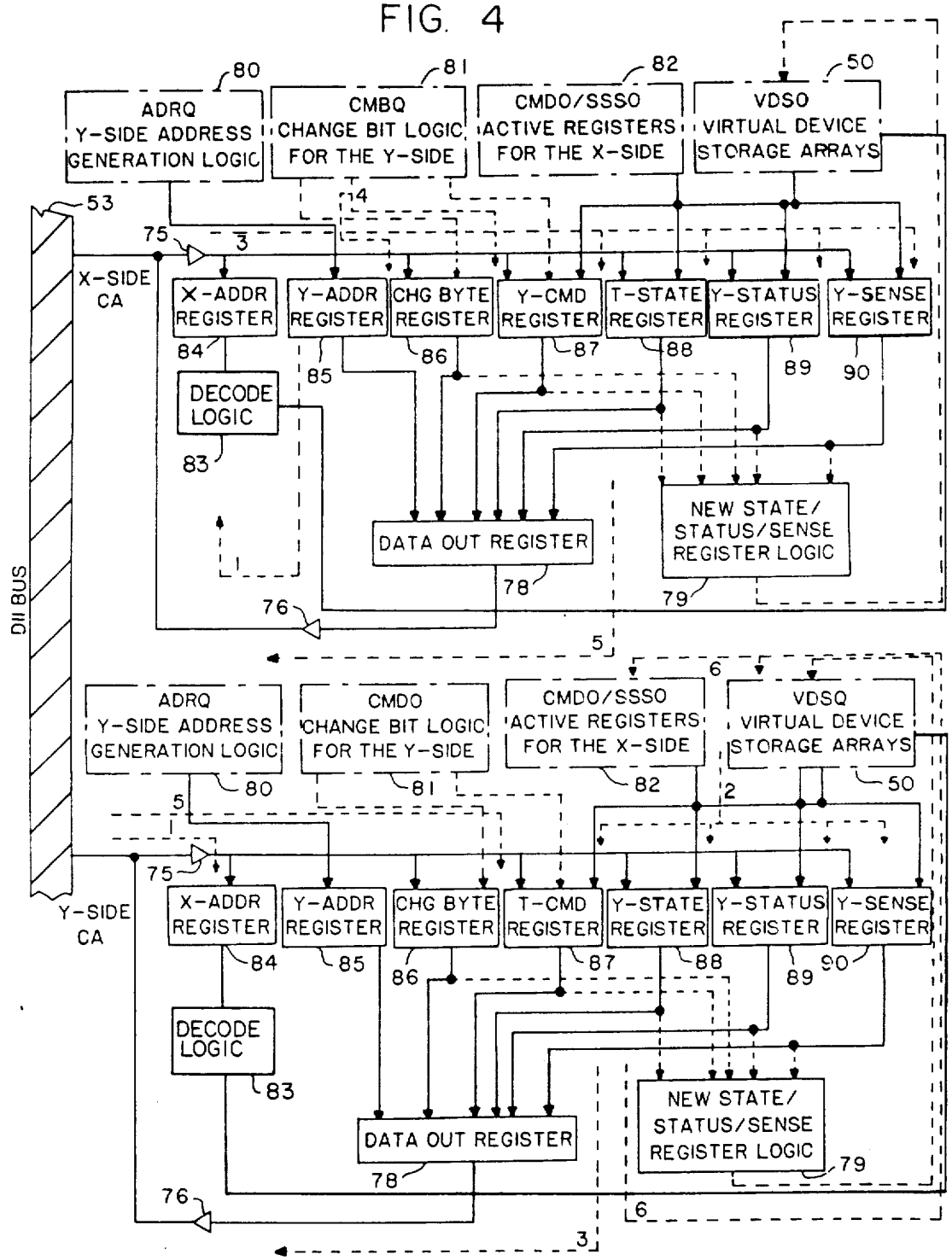

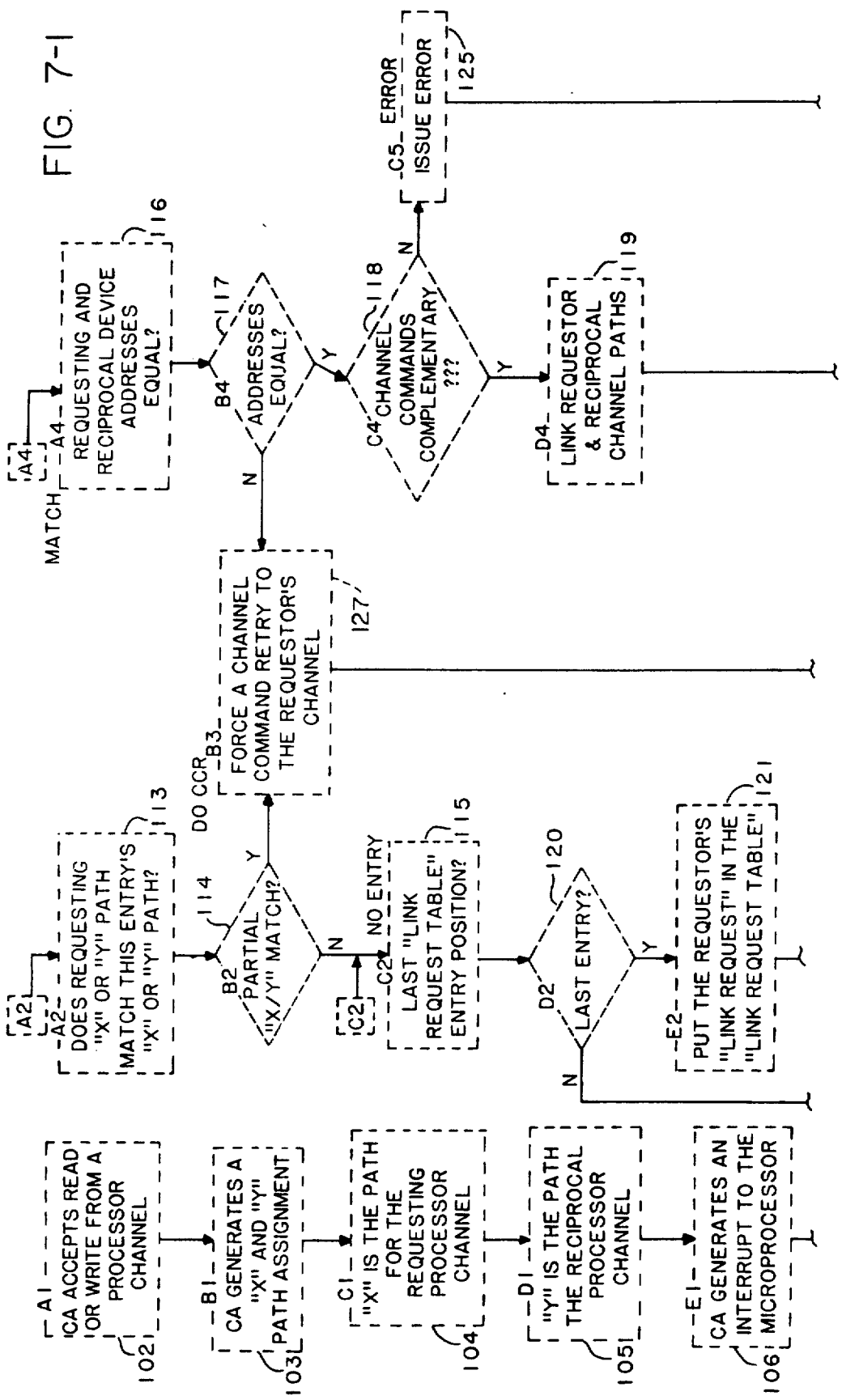

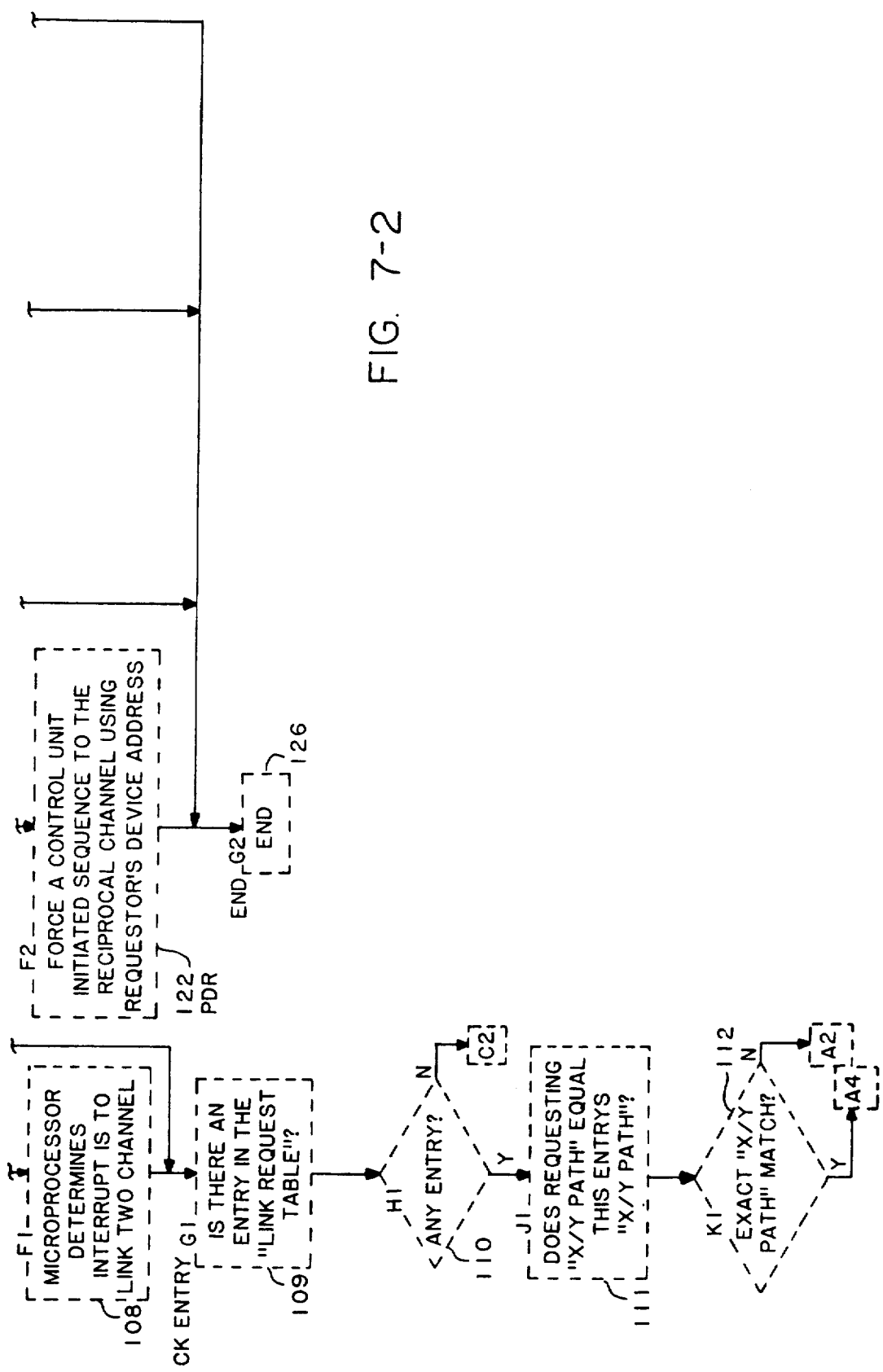

APPARATUS FOR EFFICIENTLY INTERCONNECING CHANNELS OF A MULTIPROCESSOR SYSTEM MULTIPLEXED VIA CHANNEL ADAPTERS

RELATED APPLICATIONS (1) U.S. Ser. No. 07/575,576 filed Aug. 31, 1990;
(2) U.S. Ser. No. 07/575,578 filed Aug. 31, 1990; and,
(3) U.S. Ser. No. 07/575,593 filed Aug. 31, 1990.

The present invention relates to apparatus for establishing communication links between channels of large scale data processing systems. Specifically, a channel to channel interface having complete compatability with IBM OEMI System/360 and System/370 channel protocol is described.

As described in various references, such as "IBM/360 and System/370 I/O Interface Channel to Control Unit Original Equipment Information", such systems can address up to 256 I/O devices per channel. Each channel is usually employed to control up to eight control unit attachments. One attachment point may be associated with a single device control unit, a multiple device control unit, or multiple independent control units. The channels may communicate with multiple devices on the channel by addressing connected devices through unique device addresses.

Channels of different data processing systems may also be interconnected, using a pair of channel adapters connected to each other. The interconnected systems permit the sharing of workloads between processing systems, thus improving computing efficiency for the multiple processing systems. The channel adapters provide multiple logical channel adapters to a connected channel. The logical channel adapters of a first channel adapter are connected with matching logical channel adapters for another channel by a shared communications link for the two channels.

The channel adapter architecture used to connect multiple channels must be capable of handling asynchronous requests for a communication link, as well as resolving conflicts between channels requesting a communication link. Additionally, a capability must be provided to establish a priority for requests for a link assignment which promotes communication efficiency.

SUMMARY OF THE INVENTION

It is an object of this invention to provide a control unit for managing communications between multiple data processing systems.

It is a more specific object of this invention to couple data processing systems together to provide data sharing capability and workload sharing among the processing systems.

It is another object of this invention to provide a physical channel adapter for a processor channel which forms a plurality of logical channel adapters which may be linked to logical channel adapters of another channel adapter.

It is yet another object of the invention to resolve competing requests for a communication link assignment from various channels according to various predetermined efficiency criteria.

These and other objects of the invention are provided by a control unit which intercouples a plurality of channels of multiple data processing systems. The control unit includes a plurality of channel adapters, each of which can form multiple logical adapters for the connected channels. Additionally, the control unit includes a plurality of data buses connecting all channel adapters.

A single logical adapter of one channel may be linked with the matching logical adapter of another channel via a data bus, if various criteria are met which promote an efficient use of the data bus assigned to link logical adapters.

Before a given logical adapter of one channel adapter can request a data bus assignment, the current status information of the given logical adapter and the matching logical adapter of another channel adapter must be examined. This examination is done in conformance with the "IBM Channel-to-Channel Adapter" architecture. Only logical adapters which satisfy the various architectural conditions are capable of generating a request for a link between logical adapters.

Global criteria are imposed on the architected conditions before a link request is honored, including a requirement that no other logical channel adapter is waiting for a link assignment with any logical channel adapter of a subsequently proposed communication link. In this way, the communication links may be assigned in a more efficient manner, giving earlier link requests priority over subsequent link requests.

In carrying out the foregoing objectives of the generation of link requests, each channel adapter is provided with a device information interface which interconnects each of the adapters through a device information interface bus. Status information about a given logical adapter may be obtained by the matching logical adapter which will potentially request a link with the logical adapter. A virtual device storage at each channel adapter permits the storage of information related to the status of the logical adapters associated with that adapter. Thus, the architected criteria for generating a link request may be made at the channel adapter level.

Once a channel adapter has verified that the various architected conditions are satisfied, a link request is generated. A supervisory processor is interrupted by this link request, and enters it in a link request table if other global criteria are met, insuring that conditions are present for an efficient use of an assigned data bus between adapters.

BRIEF DESCRIPTION OF THE FIGURES

FIG. 4 illustrates the device information interface interconnecting each channel adapter.

FIGS. 7-1 and 7-2 illustrate block diagrams of the steps executed by microprocessor 39 to supervise channel adapter interface traffic.

DESCRIPTION OF THE PREFERRED EMBODIMENT

Figure 1:
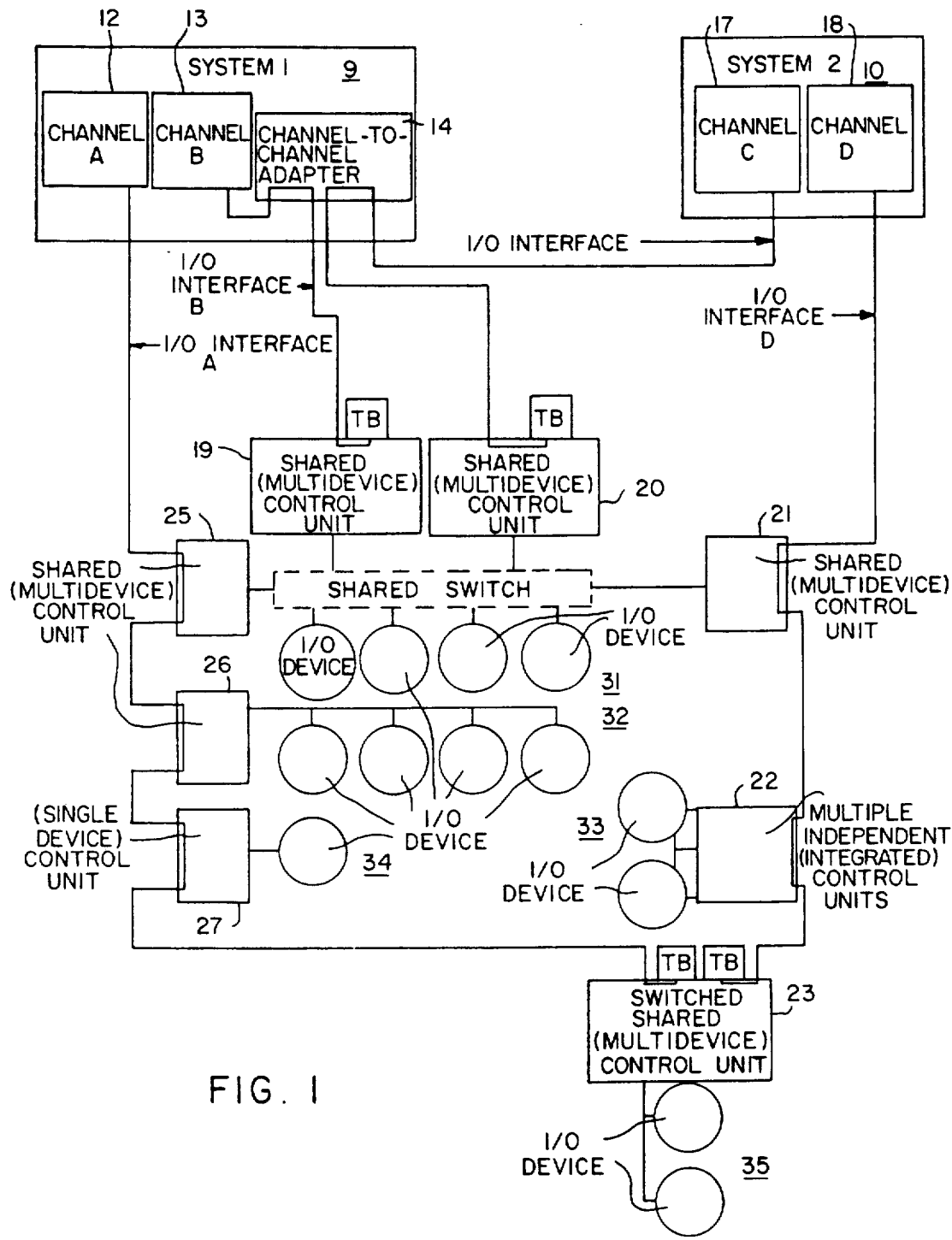
FIG. 1 illustrates an example of multiple channel configurations for large scale data processing systems using OEMI channel protocol.

Referring to FIG. 1, there is shown an example of a multiple processor, multiple channel configuration for accessing a plurality of I/O devices. FIG. 1 is illustrative of the IBM 370 System architecture which includes two processing systems 9 and 10. The two processing systems have input/output channels, 12, 13, 17 and 18. Processing system 9 is capable of accessing a plurality of control units 14,19, 23, 25, 26 and 27. Processing system 10 is capable of accessing a plurality of control units 14, 20, 21, 22 and 23. The control units recognize an address issued by the channel, and permit access to a connected single input/output device 34, or to multiple devices 31, 32, 33 and 35. It is also possible to couple channels of systems together, using a channel-to-channel adapter 14. In this way, an application running in system 9 may send data to or receive data from an application running in the second processing system 10.

The input/output interfaces associated with each channel 12, 13, 17 and 18 in the foregoing IBM 370 System architecture, operates in accordance with an OEMI protocol set forth in publications of the IBM Corporation, such as "IBM System/360 and System/370 I/O Interface Channel to Control Unit Original Equipment Manufacturers' Information". The essence of such channel-to-control unit operation is to permit multiple devices to be accessed by a given channel. These devices are either the I/O devices of FIG. 1, or may be another channel of another system, via the channel-to-channel adapter 14.

In coupling such OEMI channels together, interconnected channel adapters are employed. The channel adapters must provide for efficient transfer and exchange of information between separate channels in order that a minimum of wait time for data transfer is encountered when one logical adapter associated with one channel wishes to communicate with a matching logical adapter associated with a second channel.

Figure 2:
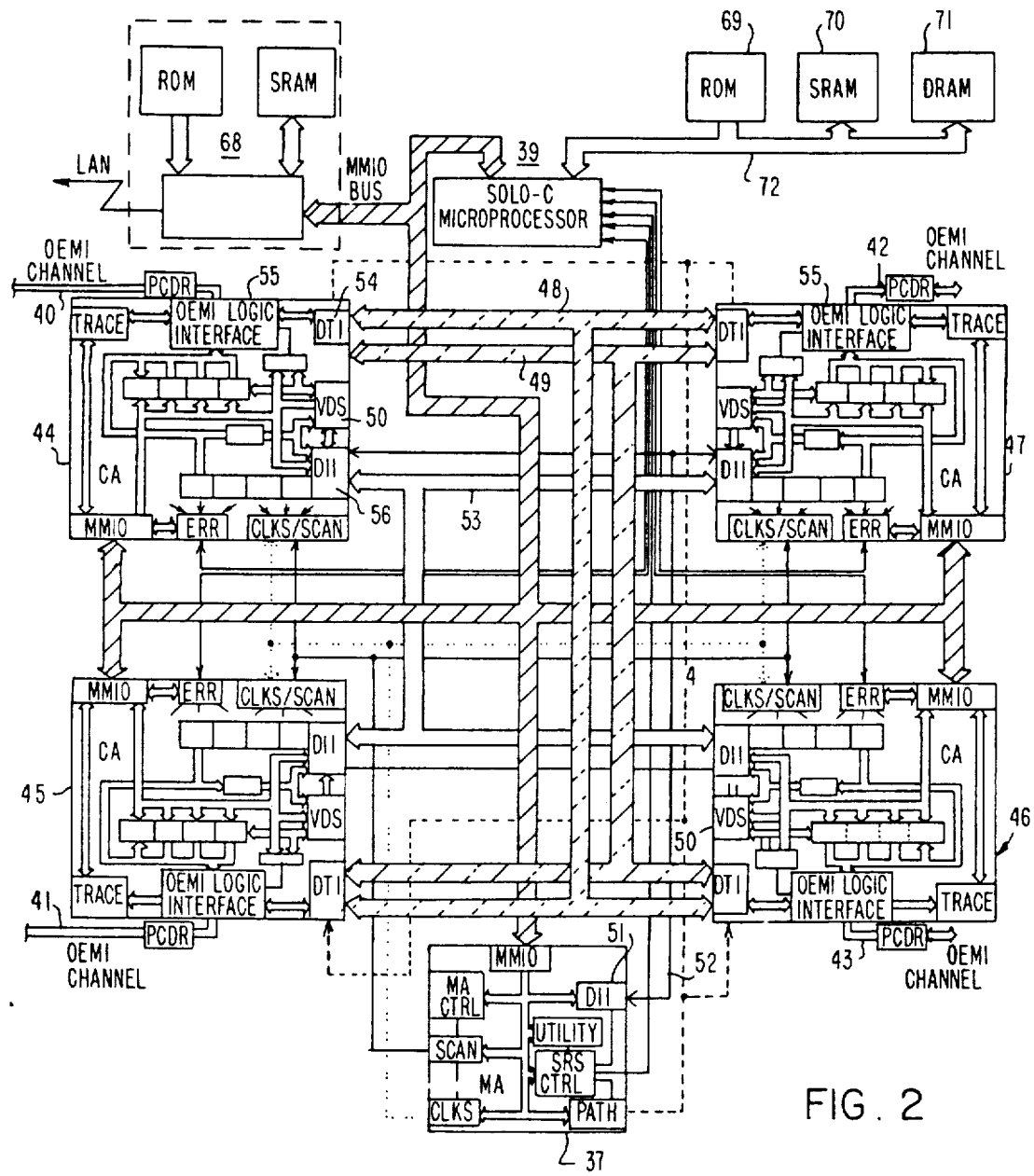
FIG. 2 illustrates a device for interconnecting multiple channels in a multiprocessor computing system which shares a data processing workload.

The present invention relates to such channel adapters, a preferred embodiment of which is shown in FIG. 2. FIG. 2 shows a system which provides channel adapters for four (4) separate processing systems. Each of the processing systems has a channel 40, 41, 42 and 43. Each of these channels requires a communication link to another channel, associated with another adapter. The adapters 44, 45, 46 and 47 are each capable of forming multiple time shared logical adapters with the remaining adapters. A logical adapter of one adapter forms a communication path, with the matching logical adapter of a second adapter, over one of two data buses 48 or 49. The adapters 44, 45, 46 and 47, permit the configuration of multiple logical adapters, only one of which may be connected at a given time to another adapter. Each of the logical adapters represent a device formed at a given instant of time to establish a link with another logical adapter of an adapter connected to a second channel. There are associated with each of the adapters, a total of 63 potential logical adapters. Each of these logical adapters identifies one half of a connection to one of the other adapters through either of two data buses 48 and 49. The arrangement is such that an interrupt driven microprocessor 39 will link one logical adapter of one adapter to a logical adapter of a second adapter when various criteria, relating to the efficient transfer of data between logical adapters has been satisfied. The microprocessor 39 responds to an interrupt from any of the four channel adapters 44, 45, 46 and 47, or from a support processor connected to a LAN interface 68.

For example, if channel 40 requests a link to channel 43 of adapter 46, the respective adapter 44 will receive an address relating to a logical adapter of adapters 46 and channel 43, for which a connection is desired over one or the other data buses 48 and 49. The adapters are configured such that each communication link so formed is represented by an address, supplied from channel 40, identifying a logical adapter in adapter 44, as well as identifying a logical adapter identified with adapter 46.

The addressing scheme for channel to channel linkage provides an 8-bit address, the first three bits of which define a channel adapter of the connected channel receiving a request to connect. The remaining bits identify a logical adapter at the receiving adapter 44 and a logical adapter at adapter 46 which are to be linked together. Thus, a single address received from a channel identifies a pair of logical adapters for which a communication link is sought.

Each of the logical adapters is treated as a device by a channel connected to the adapters 44, 45, 46 and 47. A device of adapter 44 may be connected to one of a system total of 63 devices contained in one of the remaining adapters 45, 46 and 47. It will be appreciated that only two communication paths over data buses 48 and 49 may be active simultaneously at any given time. The need is thus present to arbitrate between asynchronous commands coming in on each of the channels 40 through 43, and assign a data path to a pair of adapters, depending on various criteria relating to the overall efficient data transfer, and refusing assignment of a data path to requests which do not meet these criteria.

Each logical adapter 44, 45, 46 and 47, when receiving a data transfer request from any of its connected channels 40 through 43, will determine, using circuitry to be described, whether or not the proper architected conditions exist at the logical adapter pair for which a link is requested. If channel 40 requests a data transfer using a logical adapter associated with adapter 44, with a logical adapter within adapter 46, the requesting adapter 44 will determine whether or not the logical adapter pair is in an appropriate state to honor the data transfer command.

Once an appropriate architected state has been determined to exist, a link request is made of the microprocessor 39 which will determine, in accordance with other global considerations, whether or not to store in memory the link request in a link request table, such that a data bus can be assigned to two matching logical adapters, at the first available opportunity.

These global considerations include whether or not a previous request has been received to link with one of the adapters involved in a second request for a communications link. In accordance with the preferred embodiment, this condition will result in the link request not being added to the table, and a command to the subsequent requesting adapter to retry the request.

In following these global considerations, it is clear that channels having pending requests will be more likely to complete them, rather than the channels having newly-formed requests for a link.

In order to carry out the first condition for requesting a link, i.e., that the logical adapter pair is in an appropriate architected state, circuitry is provided in each of the adapters 44, 45, 46 and 47 to identify the conditions of logical adapters, with which a potential communication link is to be established. Using a device information interface 56 associated with each adapter, and a virtual device storage array 50, it is possible to make inquiries regarding the logical adapter with which a link is sought. Using basic arbitration circuity 51, shown in a separate maintenance adapter chip 37 connected by a signalling bus 52, it is possible to grant access to the device information interface bus 53 such that the status of a logical adapter for which a communication link is to be formed may be read from the virtual device storage 50 of the adapter containing the logical device. Thus, when channel 40 requests to form a link with channel 43 over a communication link identified by logical device X of adapter 44, and logical device Y of adapter 46, state information regarding logical device Y may be obtained from the virtual device storage array 50 in adapter 46. Once successful arbitration by the device information interface 49 for access to the device information interface bus 53 is completed, the status of logical device Y may be obtained from the virtual device storage array 50. The device information for logical device X is likewise obtained from VDS 50 of adapter 44.

As will be evident from further descriptions of the device interface logic circuitry, the virtual device storage array maintains the status information for logical adapters which are not presently active. As only one logical adapter may be working at a given time in the channel adapter, there is a high probability that the information will be in the virtual device storage array. If an attempt is made to form a link with a logical device currently employed in communication with its channel, that information will also be transferred over the device information interface bus 53 from a different register, identified as real register 60 contained in the adapter 46. In the case of the channel adapter requesting a link, this information will also be in the real register.

Associated with each interface is OEMI logic interface 55 which will provide the standard tag and data structure necessary to communicate with the OEMI channel. This OEMI logic interface receives an address representing a logical adapter for connection with another channel. The address received by the OEMI logic interface 55 includes an address offset identifying the adapter to which the channel is connected. The remaining address bits which in a preferred embodiment are 5 bits, are used to address a pair of logical adapters associated with each adapter connected to a channel. The channels treat each logical adapter as an I/O device. Thus, the OEMI logic interface 55 must identify the I/O device represented by the logical adapter address, and attempt to create a link with this logical adapter over one of the data buses 48 and 49 when requested by the channel.

The organization of each of the channel adapters is shown more particularly in FIG. 3. The OEMI channel interface 55 is shown which will provide the required protocol signals to the system channel 40. In establishing a communication link between a channel adapter and another channel adapter, system channel 40 first identifies which logical adapter pair will be used to establish the communication link. This address is stored by the OEMI channel interface 55 in address register 61. This address identifies an X logical adapter associated with the channel adapter of the requesting channel and a Y logical adapter of an adapter connected to a destination channel.

Register 61 is used to address the VDS 50 of channel adapter 44, and the command, state, status and sense information associated with the X logical adapter will be read from VDS 50. The X logical adapter information is stored in register 60.

Next, system channel 40 identifies the type of operation it wishes to perform via the X logical adapter. This operation is identified when system channel 40 sends a command byte to channel adapter 44. Refer to "IBM Channel-to-Channel Adapter" architecture document for a functional description of each command byte. The OEMI channel interface 55 stores the command byte in the X command position of register 60. At this point, all information regarding the X logical adapter and the current system channel 40 operation request is known.

In order to decide whether or not the current channel 40 request can be handled, information concerning the Y logical adapter must be obtained over the device information interface bus 53. Address register 61 of channel adapter 44 is also used to identify the channel adapter and specific logical adapter for which information is desired over the connected device information interface (DII) bus 53. After acquiring the DII, and addressing the VDS 50 or register 60 of the second channel adapter, the current command, state, status and sense information of the Y logical adapter, serving as an I/O device for another channel, is transferred via the device information interface (DII) 56 to register 62. Thus, all information pertaining to the current state of the Y logical adapter will be found in channel adapter 44 register 62.

Now that the current state of both the X and Y logical adapters is known, a decision can be made as to how channel adapter 44 will respond to the command byte issued by system channel 40. If the proper architected conditions are found to exist for both the X and Y logical adapters, then an interrupt may be posted via the MMIO interface 67, informing microprocessor 39 that a data bus link with channel adapter 46 is desired.

Figure 3A:
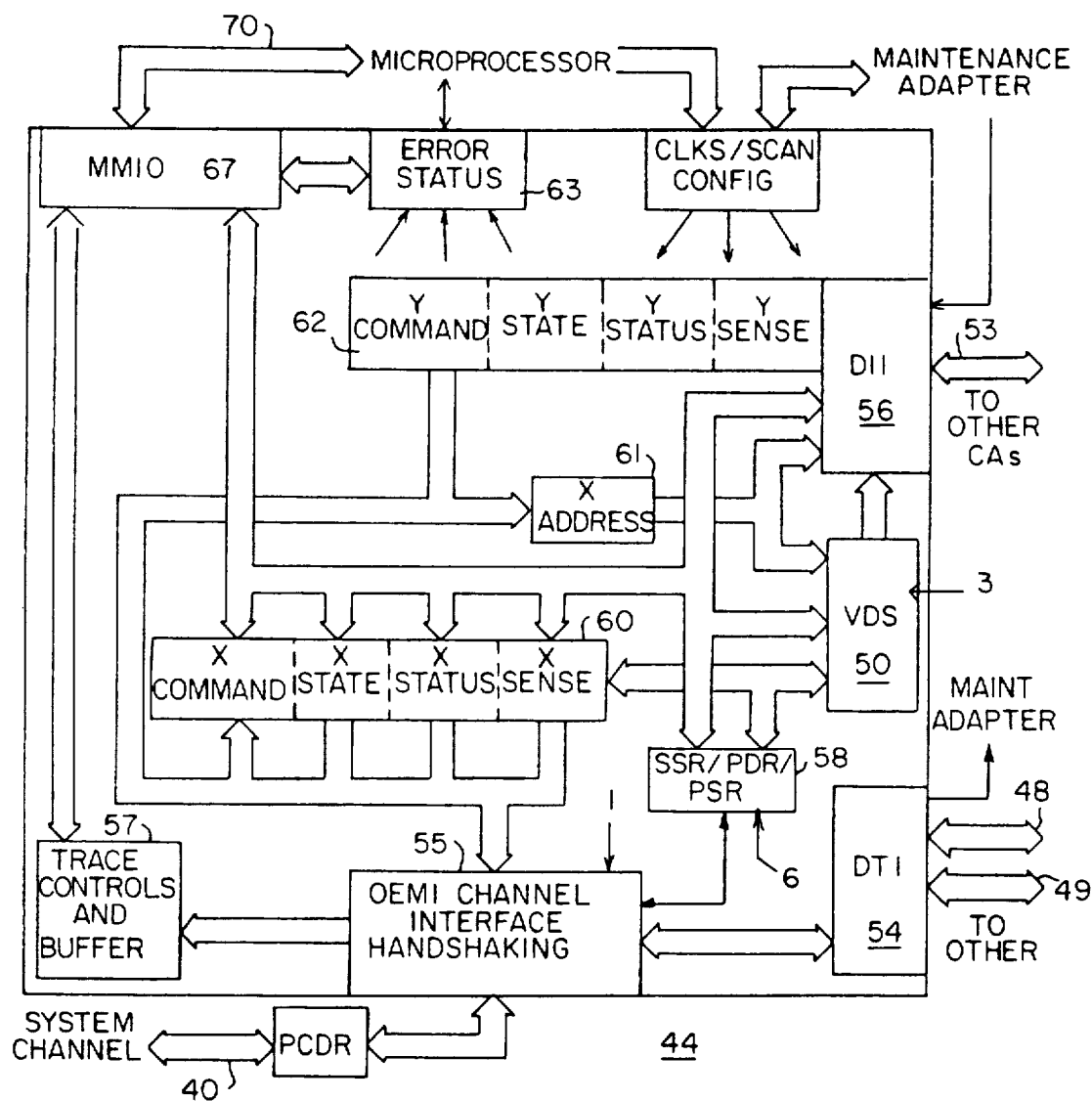
FIG. 3A is an architectural illustration of a channel adapter used to couple a channel to another channel adapter.
Figure 3B:
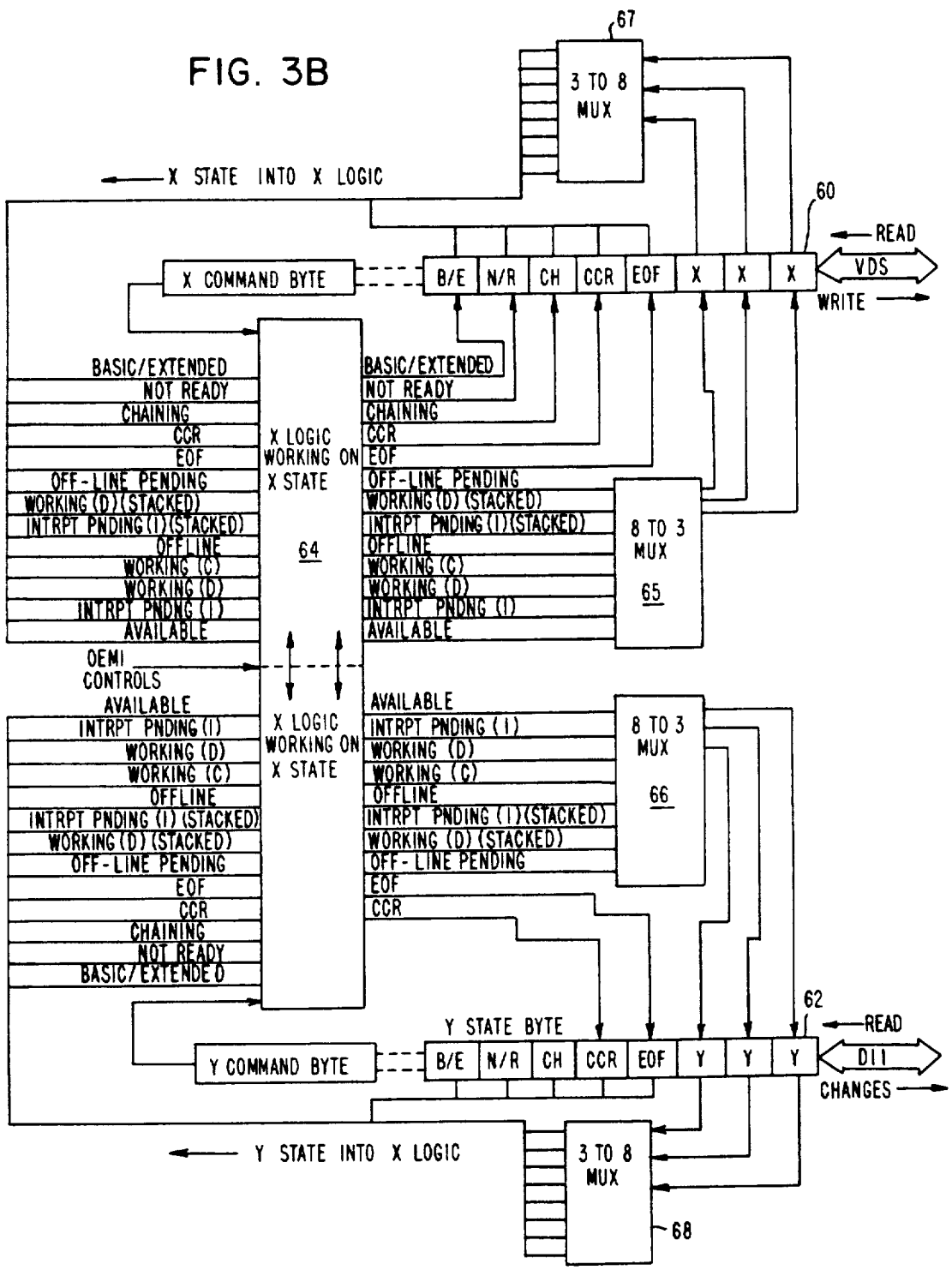
FIG. 3B illustrates decisional logic circuitry for comparing the state of logical adapters which are to be linked together.

Referring to FIG. 3B, there is shown a logic circuit 64 for accomplishing several tasks of the process of determining whether or not a link request interrupt should be issued to the microprocessor 39. The logic 64 can make a comparison between the X and Y command, state, status and sense bytes of the logical adapters for which a communication link is sought. If the command issued by system channel 40 is either a READ, READ BACKWARD or WRITE type command, and the appropriate architected conditions prevail in the remaining bytes of X and Y information contained in registers 60 and 62, respectively, then the logic circuit 64 will issue a signal to the OEMI control interface, indicating that the X logical adapter may accept the pending channel command. The OEMI channel interface 55 will then present a byte of status information, generated by logic circuit 64, which informs the channel that the command has been accepted for immediate execution by the X logical adapter. Once this initial status is accepted by the channel, the OEMI channel interface 55 issues a link request via the MMIO port as an interrupt to the microprocessor 39. This will be recognized and handled as a link request by the microprocessor 39.

Upon deciding how to respond to a channel command, logic circuit 64 will change the state, status and sense bits, when appropriate, pertaining to the X and Y logical adapters reflected by registers 60 and 62. For instance, if the available condition was determined to prevail for both the X and Y logical adapters and a READ or WRITE command was issued by the channel, logic circuit 64 would update the bits in register 60 to a working (D) state. Thus, the logical adapter information on the X adapter side would be updated to the appropriate architected state and status for permitting the command to be accepted and executed. Other states for the logical adapter are shown in FIG. 3B, and may be entered, depending upon the relationship between the X and Y logical adapter information contained in registers 60 and 62 for which a data path may be proposed.

It should be noted that the OEMI channel adapter may make inquiries to the connected adapter for the status of any proposed logical adapter connection. This information would then be read from either register 60 or 62, without necessarily requiring a data path assignment to complete the inquiry.

A pair of MUXs 65, 67, 66, 68 are shown only to indicate that encoding is employed for the various states indicated in the working logic 64.

Logic circuit 64 may also alter the Y logical adapter state, status and sense information when deciding how to respond to a channel command. This is accomplished when change byte information is sent across the device information interface after logic circuit 64 decides to accept or reject the channel 40 operation. In the above example, if the available condition was determined to prevail for both the X and Y logical adapters, and a READ or WRITE command was issued by the X channel, logic circuit 64 would formulate change bytes which would alter the Y logical adapter state and status bytes to reflect a pending attention interrupt condition.

The altered status byte caused by the aforementioned change bytes destined for the Y logical adapter result in the setting of SSR/PDR/PSR register 58 on the adapter associated with logical adapter Y. This will force the OEMI channel interface 55 to recognize that there is a request for connection to a respective logical adapter, and signal its respective system to examine and service the request.

Once channel 43 recognizes and services the attention condition for the Y logical adapter, application software running on the system attached to channel 43 is relied upon to determine the cause of this condition. System software accomplishes this by issuing architected channel-to-channel adapter commands to the Y logical adapter over channel 43. The Y logical adapter's response to these commands indicate what type of command is pending on the X logical adapter. The system software communicating with the Y logical adapter is then relied upon to issue a complementary command over channel 43. By complementary commands, one of the most common would include a READ request of the X logical adapter by channel 40, which is complementary to a WRITE request. Thus, if the application software communicating with the Y logical adapter responds with a WRITE command to the logical adapter Y, with a READ command pending on the X logical adapter, the channel adapters will have met criterion for connection with a data bus. Alternatively, this criterion can be met by the VDS 50 in channel adapter 46 having stored therein the status of the Y logical adapter as having a pending WRITE command prior to issuance of the READ command by the X logical adapter. Acceptance of the WRITE command by the Y logical adapter is indicated to channel 43 via the presentation of an architected status byte to the channel. Upon acceptance of this status by channel 43, a link request interrupt is generated by the Y logical adapter, indicating a desire to exchange data with the corresponding X logical adapter. Microprocessor 39 must now determine whether or not more global concerns will permit the link to be established.

Also shown in FIG. 3A is a trace control and buffer 57, which is the subject of U.S. patent application Ser. No. 07/575,578.

The trace control and buffer 57 is a diagnostic tool which can record the state of the OEMI channel interface 55, as well as other important criteria such as the time certain conditions exist on the channel interface, commands existing on the channel interface, and other diagnostic measures. The trace control and buffer 57 is controlled by the MMIO interface 67. The trace control and buffer 57 will begin recording events, identified by data received from the microprocessor 39. Additional commands for the MMIO interface 67 from the microprocessor 38 will read out the data, and any diagnostic routine which will permit analysis of the operation of the channel adapter, under certain conditions relating to the trigger events supplied by the microprocessor 38. FIG. 2 illustrates a LAN interface 68 which permits the programming of microprocessor 39 from a support processor (not shown) connected to the LAN. The support processor can read out any error data collected by the microprocessor as well as any trace data read by the microprocessor 39. The ROM 69 maintains permanent configuration instructions for microprocessor 39 to permit it to be accessed by the support processor. ROM 69, SRAM 70 and DRAM 71 are connected via an internal memory bus 72 to microprocessor 39. Operating code received from the support processor resides in DRAM 71, while the SRAM 70 holds temporary calculations by microprocessor 39.

Before describing the operation of microprocessor 39 for acting on the request for a link more specifically, a detailed example of the foregoing adapter to adapter data transfer of logical adapter status information for determining whether a link request is to be formed will be described.

The device information interface 56 (DII), which permits any channel adapter to obtain the status and information relative to a logical channel device for which a connection may be proposed, is shown more particularly in FIG. 4. Referring to FIG. 4 there is shown the data information interface logic found on two channel adapters, an X and a Y channel adapter. The X adapter is assumed to be the adapter connected to a channel originating a request to connect with a channel connected to the Y side adapter. The two channel adapters involved in a proposed communication link between the X-side channel adapter and the Y-side channel adapter are interconnected by the device information interface bus 53 (hereinafter DII bus). Assuming that a successful arbitration for access to DII bus 53 has been made by the X-side channel adapter, information regarding the proposed second half of the communication link may be derived from the Y-side channel adapter.

The data information interface logic circuit of each channel adapter includes an address register 85, shown as a Y-address register. The Y-address register is the register containing the address of the logical adapter on the Y-side, i.e., the side which will make up the second half of the communication link. Assuming that the request is being originated at the X channel adapter, the Y register 85 will generate the address for the logical adapter in Y-side channel adapter. The data out register 78 will, through the line driver 76, send the requested logical adapter address down the DII bus to the Y-side. A data receiver 75 will load what is shown as an X address register 84 with the address identifying the logical adapter in Y-side channel adapter for which a connection is proposed. Only one channel adapter will recognize this address as identifying a logical adapter for that adapter.

The logic circuitry 83, which is dedicated logic circuitry, will decode the X address register 84, and determine whether or not an entry is provided in the virtual device storage array 50 for the addressed logical adapter. The virtual device storage array 50 maintains the command, status, state and sense byte information for every logical adapter associated with the Y-side channel adapter which is not currently involved in a communication link. A real register 82 contains the same information when a logical adapter of the Y-side channel adapter is presently involved in a channel communication. The X address register 84 addresses the virtual device storage array 50 to obtain the logical adapter status information.

Upon decoding of the address in the X address register 84, the related Y-side data is read from the virtual device storage array 50, or real register 82 to the registers 87, 88, 89 and 90. The data out register 78, upon receiving a clocking signal, will drive the DII bus 53 through the bus driver 76, with the required information regarding the Y-side logical adapter for which a link is proposed.

The foregoing logic circuitry of the X side channel adapter will request access to the DII bus 53 by contending for access to the bus. This contention is sensed at the maintenance adapter 37, and resolved on a first request-first access basis. An ENABLE signal from a contention resolution circuit, arbitrating the request for information from the DII bus 53 will grant access to the requesting X side channel adapter to address the Y side channel adapter.

Figure 5:
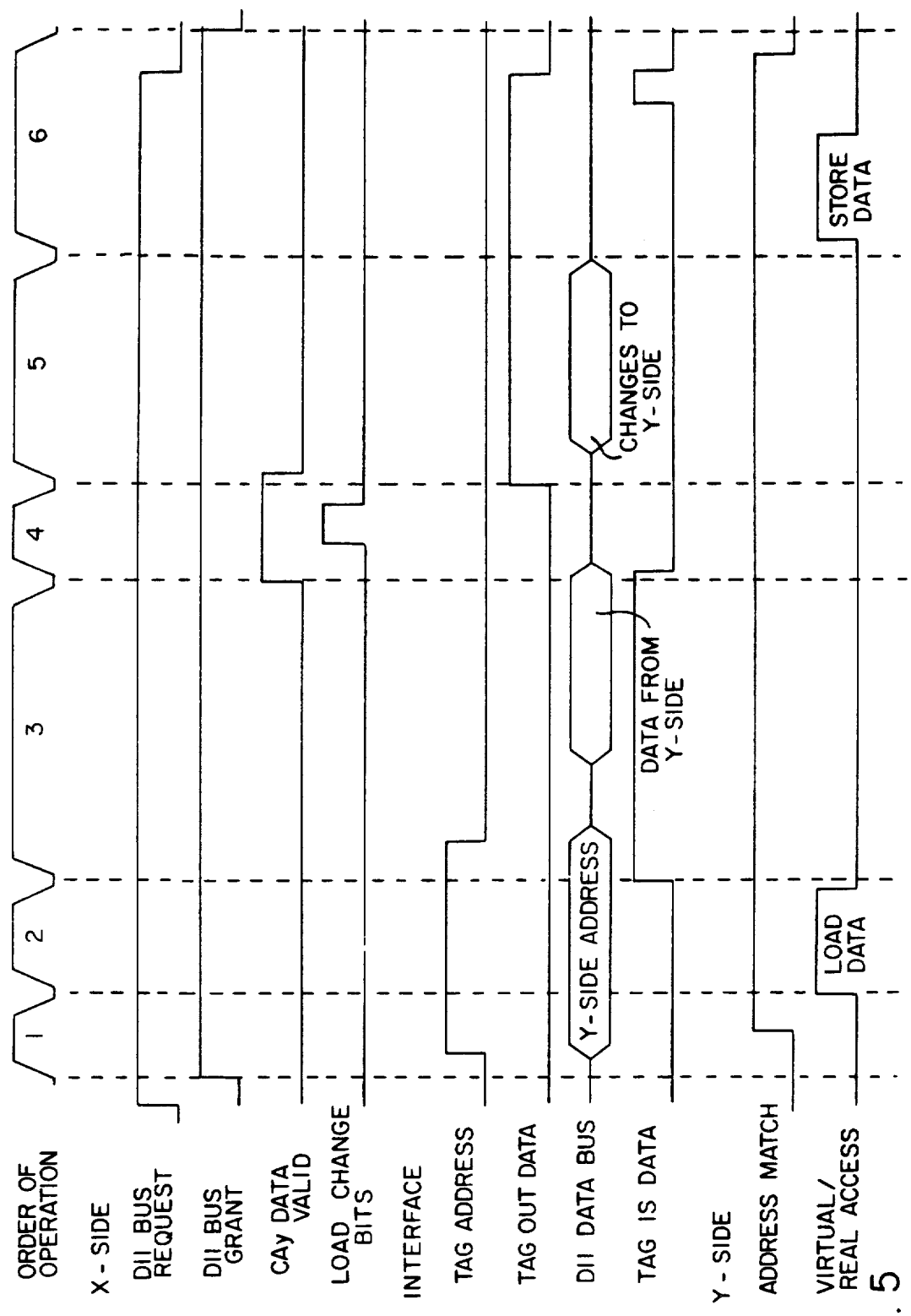
FIG. 5 is a timing diagram illustrating the operation of the device information interface of FIG. 4.

The operation of the foregoing circuitry is also described in FIG. 5, which illustrates a timing diagram for the operations labelled 1 through 6 on FIG. 4.

Referring to FIG. 5, the DII bus request signal is shown asserted on the X-side channel adapter. Once the bus arbitrator contained in a maintenance adapter 37 shown in FIG. 2 has granted access to the request, a bus grant line is enabled for the X-side channel adapter. At this point, data may be transmitted to the Y-side channel adapter identifying the address of a logical channel adapter for which command, status, state and sense information is required. The interface will carry the Y-side address and a line associated with the DII bus, the tag address line is raised during this Y-side address transmission.

Once the Y-side channel adapter recognizes its own address, received over the DII bus, the tag end data line will be raised. The information sought from the virtual device storage array 50 or real device register 87, 88, 89 and 90, in the case of a logical adapter currently involved in a channel communication, is loaded on the Y-side into the data out register 78. The data transmission from the data out register 78 may commence as soon as the tag in data line of the DII data bus is raised. This will permit the data from the Y-side to be loaded to the X-side channel adapter via the DII bus 53. The X-side CA receives the reply from the Y-side channel adapter, and validates the data during interval 4. The received data is entered in register 62 of FIG. 3A and applied to a change bit logic circuit 81 (FIG. 4) on the X-side channel adapter. The change bit logic circuit 81 is a portion of the dedicated logic 64 of FIG. 3B. For example, change bytes will be generated if the information presented by the Y-side channel adapter indicates that the Y logical adapter is available when the X logical adapter accepts a READ, READ BACKWARD or WRITE command. If so, change bytes are transferred to the Y-side channel adapter, changing the status of the Y logical adapter for which a communication link is sought. These changes to the Y-side are applied to the change byte register 86 and transferred to the data out register 78. These data bits are transferred over the DII bus 53 as change bytes to the Y-side. The change bytes apply updates to the Y logical adapter information, and this data is stored in the virtual device storage array 50 at the address corresponding to the Y logical adapter for which the communication link is sought.

The received information is applied via a new state, status, sense register logic circuit 79 to update the virtual device storage array 50. In the event the Y logical adapter is engaged in a current transaction, this information will be stored in real register 60 of FIG. 3A for the Y logical adapter.

Thus, information has been received, and acted on, by the X-side channel adapter to generate a request for status information to the Y logical channel adapter. The status of the Y logical adapter, which will complete the link, has been changed from a state indicating it is available, to a state indicating there is a transaction pending at the X logical adapter whose completion depends upon a complementary command being issued to the Y logical adapter. Additionally, the Y logical adapter status byte is changed to signal to the OEMI channel interface to assert an ATTENTION interrupt to the channel, thus bringing the channel's attention to potential traffic via the Y logical adapter.

Having thus determined, at the channel adapter level, that the proposed communication link is possible because both the X and Y logical adapters are in a proper architected state, the X and Y logical adapters may therefore request a link assignment of one of the data transfer buses 48 and 49 to the logical adapter pair.

Figure 6:
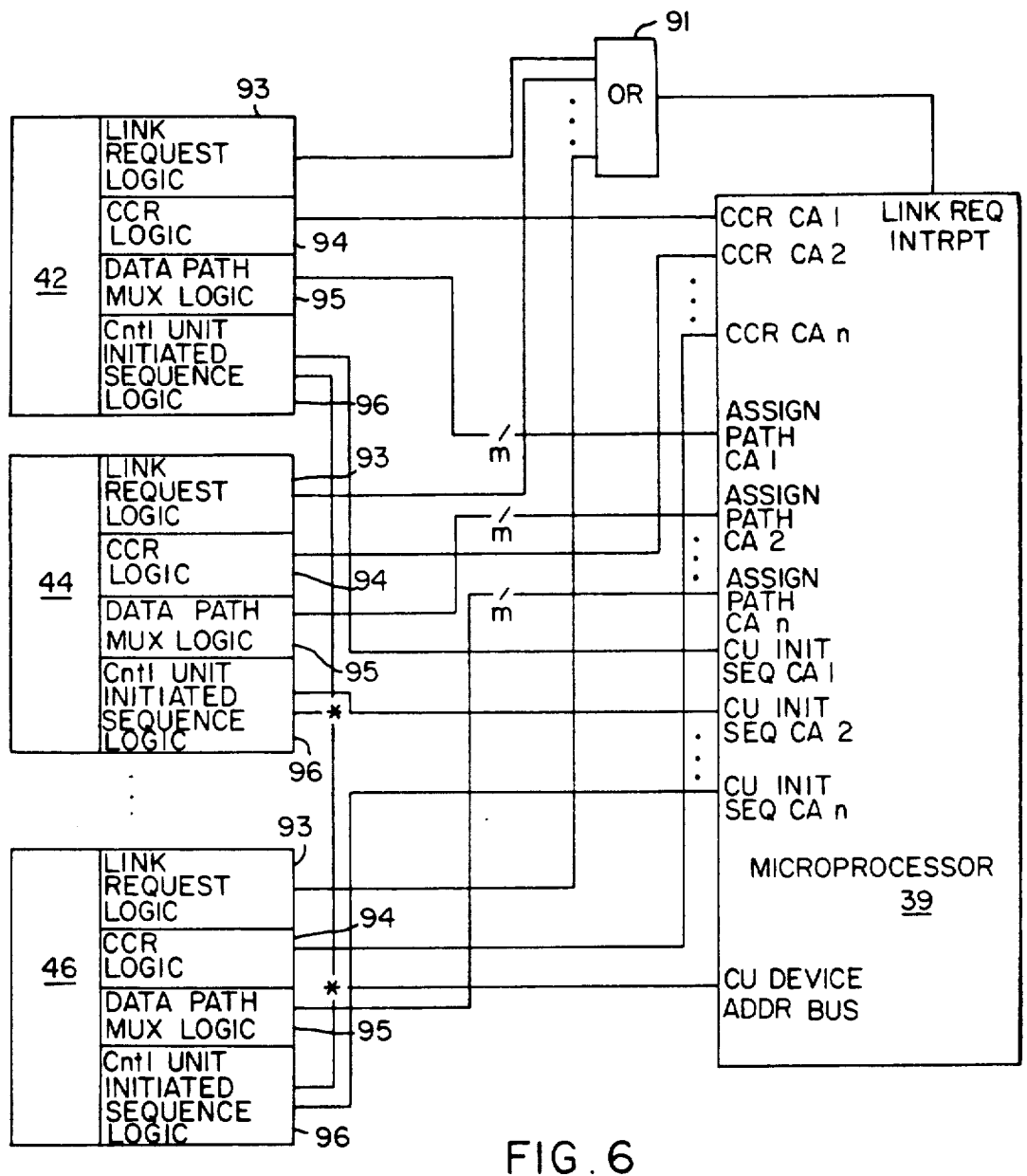
FIG. 6 is an illustration of the control sequence between channel adapters and a supervisory microprocessor which permits global supervision of traffic between channel adapters.

Each of the channel adapters has link request logic associated therewith for generating an interrupt to the microprocessor 39 such as to request a bus link 48 or 49 between the channel adapters for which the link request was issued. Referring now to FIG. 6, there is shown each of three channel adapters connected via the microprocessor bus 70 to microprocessor 39 the fourth 45 being omitted for clarity. The microprocessor bus 70 includes a dedicated line from each channel adapter from link request logic circuits 93 through an OR gate 91. FIG. 6 illustrates the connection of each link request logic circuit generating the link interrupt. Each of the channel adapters is connected via the microprocessor bus 70 to the microprocessor 39. The bus 70 permits the logical connection shown in FIG. 6 to be made to each of the channel adapters to provide global supervision over channel adapter requests for links.

Link request logic associated with a channel adapter, generates an interrupt to the microprocessor 39. The particular interrupt level is identified by the microprocessor 39 as a request for a link. When this link request interrupt is received from OR gate 91, the MMIO bus 70 will perform a polling of each of the channel adapters through the memory mapped I/O ports 67 of each channel adapter through CCR logic 90 to determine the logical channel adapter addresses, X and from address register 61. The identity of the logical channel adapter which generated the interrupt is received in the MMIO bus 70 in response to the polling command.

A microprocessor 39 will then commence to form a link table in its memory which will assign, on a first in, first out basis, one or the other of buses 48 and 49, to a pending link request between two channel adapters involved in the link. The link request table stores each request in a location identified with each adapter involved in a link. The microprocessor will post a command over MMIO bus 70 to a channel adapter issuing a link request interrupt when entry to the link path assignment table is denied. This will be in the form of a RETRY command, indicating to the OEMI channel interface that the channel adapter link request has been denied, and that the requesting channel reissue the command at a later time.

When a given link request interrupt is added to the link request table, it indicates that the current global conditions seen by the microprocessor 39 suggest the efficient use of a data bus by the logical adapter X requesting the path. If the matching Y logical adapter has not as yet requested a data path via a link request interrupt, the microprocessor 39 will attempt to force the presentation of any status which may be pending for the Y logical adapter at the soonest available opportunity. This is accomplished via microprocessor 39 communication with the control unit initiated sequence logic 96 of the Y-side channel adapter. This logic is employed to inform the channel that the Y logical adapter has pending status to present. This will be described more completely with respect to the count register 141 of FIG. 8 on each channel adapter.

If the matching Y logical adapter has already requested a data path via a link request interrupt and the data transfer commands are determined to be complementary by microprocessor 39, the link request by the X logical adapter will be added to the link request table, and one of data buses 48 and 49 will be assigned for the exchange of data. This assignment causes the appropriate data path MUX logic circuits 95 of FIG. 6 to be enabled on both the X-side and Y-side channel adapters.

To complete the discussion regarding the assignment of a data bus to each link request, FIG. 7 illustrates a flow chart of programming steps executed by the microprocessor 39 to determine whether or not a link request is eligible for entry in the request table, and will therefore receive assignment of a data bus 48 or 49.

As an overview of the path assignment criteria represented by the flow chart of FIGS. 7-1 and 7-2, numerous decision blocks 112, 114 and 117 are essential in determining whether or not a channel adapter receives priority for entry into the link request table. The first can be seen as a determination in step 112 as to whether or not the X-side channel adapter request exactly matches a previous entry in the link request table. If not, there is a determination as to whether or not this is a partial match in step 114. A partial match means a pending request in the link request table wherein one of the adapters involved in the subsequent request is part of an earlier-received request. If so, the program forces a channel command retry in step 127 to the requester's channel at a later time, when presumably the earlier request would have been completed. If not, the current X-side channel adapter link request will be added to the link request table if all other table entries have been checked and no exact or partial matches were found.

Another way in which a link request will be added to the link request table is if the current X-side channel adapter request exactly matches a previous entry in the link request table. A check is then made to see if the logical adapter addresses active on the X-side channel adapter and the channel adapter which has the matching entry in the link request table constitute a matching X-Y logical adapter pair. If so, a second verification is made in decision block 118 to determine that the channel commands are complementary for this link request. This was checked at the device level and, in the event there is not a match, an error is present and is issued by the microprocessor. If the channel commands are complementary, step 117 will permit the request to be added to the link request table and assignment of a data path to the requesting X-Y channel adapter pair in step 119.

Having thus described the principal conditions imposed on granting a link request, the steps of FIGS. 7-1 to 7-2 will be described in more detail.

Block 102 represents the condition where the channel adapter accepts a READ or WRITE from a processor channel. This results when the channel protocol signals a channel adapter for access to a second channel associated with another channel adapter. In step 103, the channel adapter will identify the channel adapters for which a communication path may be requested. In step 104, X is defined as a logical adapter for the channel adapter of the requesting channel, and Y is defined in step 105 as the path for the processor channel serving as the destination for the request. Once the device level architected conditions have been satisfied, as described in connection with the operation of the device information interface 56 and the logic circuit 64 of FIG. 3B, the channel adapter can generate an interrupt in step 106 for the microprocessor. The interrupt has a level defined such that the microprocessor can determine in step 108 that the interrupt is a request to create a link between two channels.

At this point, the microprocessor 39 will execute a routine to determine whether or not the link request would be entered in a link request table in its memory in light of criteria as to the status of channel adapter to channel adapter activity.

The first criterion determined by the microprocessor is represented in step 109 and decision block 110. In this situation, any previous entry to the link request table will force a consideration as to whether or not a partial or exact match exists between the current request for a link, and a previously stored request for a link between logical channel adapters. If there is no exact or partial match in the link request table, as determined in step 109 and decision block 110, control shifts to step 115. Each link request table entry is examined and if the current entry is the last one, as determined in decision block 120, the requestor's link is added to the request table in step 121. In step 122, the microprocessor will force a control unit-initiated sequence to the control unit-initiated sequence logic 96 of the reciprocal channel, using the requestor's device address. This is effected in step 122 by having the microprocessor 39 over the MMIO bus 70 forcing the address of the logical adapter in the count register 141 (FIG. 8) of the channel adapter connected to the reciprocal channel. The pending status storage register 140 for this channel will then present an interrupt to the channel from the link request logic 93, indicating that a link to the channel is being requested.

When a previous request has been entered in the link request table, the previous request is compared in step 111 and decision block 112 with the new request to determine whether or not a channel adapter of the new request is involved in a previous request. If there is an exact match, i.e., channel adapters of the previous request are the same as those of the subsequent request, the control path identified by step 116 is entered, wherein it is determined whether or not the logical adapters involved in each of the requests are the same. In step 117, if these addresses are determined to be equal, the channel proceeds through a verification in decision block 118 if the channel commands are complementary. As this criteria was checked at the device level, any non-complementary commands are deemed to be in error, and the processor 39 issues an error indication in step 125.

If, in decision block 112, only a partial match was found between a pending request and the newly-received request, step 113 and decision block 114 determine whether there is a partial match, and force in step 127 a RETRY channel command to the partially matched channel.

If the channel commands are found complementary in decision block 118, then the link request is entered in the link request table in step 119, and one of two data paths 48 and 49 is assigned to the channel adapter pair. The link requests are taken in turn, in the preferred embodiment, so that assignment of one of the two data paths 48 and 49 to the involved channel adapters of a link request may be effected.

Figure 8:
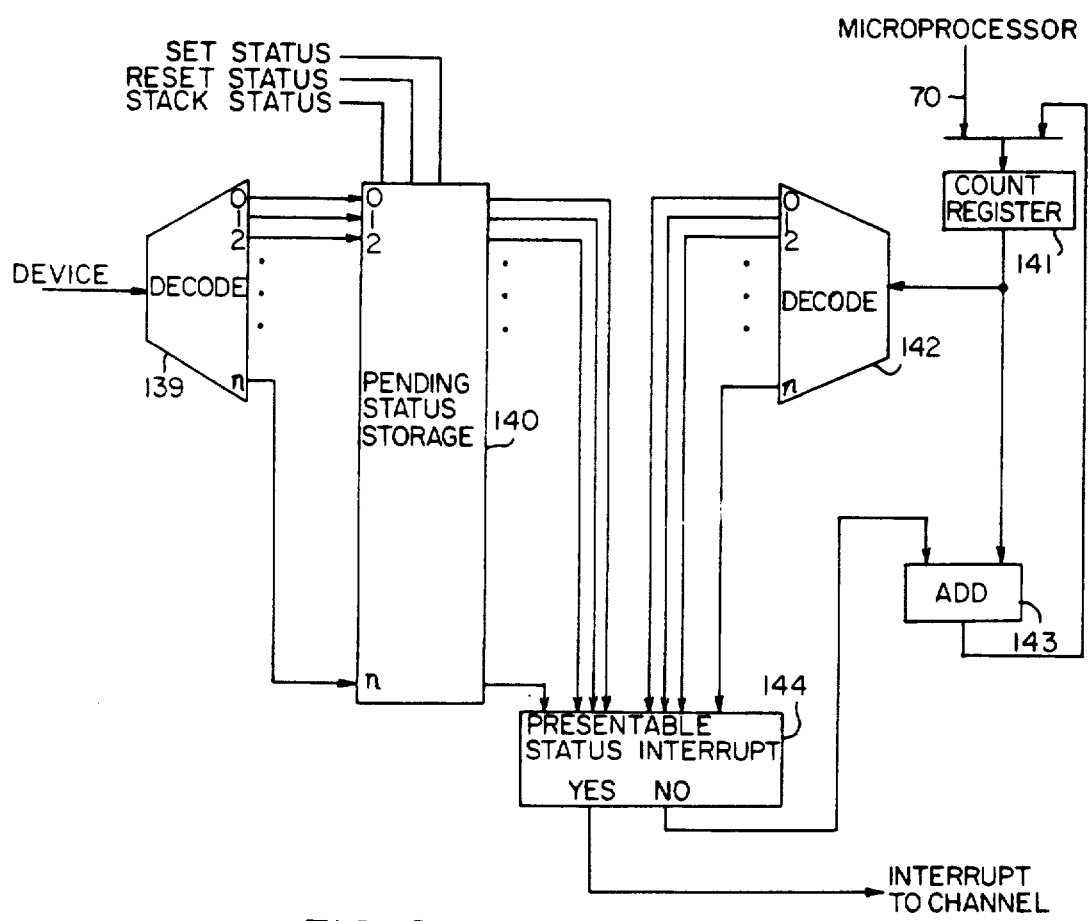
FIG. 8 is a block diagram of the pending status register associated with each channel adapter for presenting status to a connected channel.

Once the link request has been entered in the table via step 121, the microprocessor 39 will take action to insure that the next logical adapter to be active on the Y channel (the channel for which a communication is sought by an X channel) is the matching logical adapter by setting the pending device register for the Y channel adapter in step 122. Referring to FIG. 8, there is shown a pending status storage register 140 with an address pointer 141. The microprocessor 39 connected via the MMIO bus 70 will force the logical channel adapter address into the count register 141. The count register 141, having been thus set, and which is subsequently incremented by an ADD network 143, decodes the address of a logical adapter having status to present to its connected channel and applies it to status logic circuit 144.

A pending status storage register 140 includes a memory location for each logical adapter of a channel adapter, which can receive two bits of status information. The pending status storage register 140 is set when any status bit is enabled by the change bytes sent by the X-side channel adapter to change the status of a device in the Y-side channel adapter virtual device storage. For example, at the time the Y logical adapter status is written back to the virtual device storage array after the change bytes are processed by the Y-side channel adapter, the state and status of the logical adapter is changed from an available state to an interrupt pending state, with attention status when a READ, READ BACKWARD or WRITE command is accepted by the X logical adapter. The address applied to the virtual device storage array is also applied to the decode circuit 139. The simultaneous presentation of the status bit to the pending status storage register and the address for the logical adapter whose status is being updated, as provided by decode circuit 139, sets a pending status condition in the pending status storage register 140.

Thus, each of the logical devices has a location in pending status storage register 140 to indicate if the logical adapter has status to present to its connected channel. The pending status bits are presented at the output of the pending status storage register 140, where they may be compared with the decoded contents of count register 141.

It is therefore clear that as the count register 141 is forced to receive an address identifying a particular logical adapter for which a link request is pending, this will result in a presentable status interrupt being generated from logic circuit 144, gated by the decode circuit 142. Thus, each of those logical adapters has a status to present to its channel. The output of the pending status register is continuously scanned, and when pending status is found, it is presented for the logical adapter identified by the count register to its OEMI protocol logic. At that time, the logical adapter can be made real by the OEMI protocol logic when the status presentation sequence is honored by the OEMI channel. This procedure requires a transfer of the data contents for the logical adapter from the virtual device storage array to the real register 60 shown in FIG. 3A. At this point, the logical adapter represented by the counter register 141 has become connected to the channel.

Thus, there has been described an apparatus which will permit the formation of multiple logical adapters representing I/O devices of a connected channel. These devices may be connected together in accordance with criteria which will enhance the efficient transfer of data between channels.

Having thus described our invention, what we claim as new and desire to secure by Letters Patent is:

1. Apparatus for efficiently interconnecting data channels of a multiprocessor facility comprising:

a plurality of channel adapters, each channel adapter having an I/O port connected to one of said channels;

a microprocessor connected to each of said channel adapters, said microprocessor receiving from each adapter a respective channel request for a data link to another channel associated with another adapter, said microprocessor forming a link request storage table, and storing in said link request storage table only such requests which meet predefined criteria which identifies conditions in which channels may be efficiently interconnected; and, first and second data paths interconnecting said plurality of channel adapters through a multiplexer associated with each of said channel adapters, said multiplexers being enabled by said microprocessor in response to said data link requests which meet said predefined criteria.

2. The apparatus of claim 1 wherein said predefined criteria includes no other channel having a request pending for connection to said another channel through said another adapter.

3. The apparatus of claim 2 wherein said predefined criteria includes a requirement that the another channel has a pending request to be linked with said requesting channel.

4. The apparatus of claim 1 wherein said microprocessor responds to requests which do not meet said criteria by posting a retry command to said channel adapter.

5. The apparatus of claim 1 wherein said link request storage table stores the identity of channels having a link request meeting said criteria.

6. The apparatus of claim 5 wherein said microprocessor enables connection of said data paths to said channel adapters on the basis of first in first out link requests which are stored in said link request storage table.

7. The apparatus of claim 1 wherein link requests meeting said criteria are stored in said link request table awaiting a matching request from said another channel, which results in said microprocessor enabling said multiplexers to connect said channels.

8. The apparatus of claim 7 wherein said link request table stores each request from an adapter in a location identified with said adapter.

9. The apparatus of claim 8 wherein said adapter issues an interrupt to said microprocessor which identifies that architected conditions for channel adapters involved in a channel request for connection are met.

10. The apparatus of claim 9 further comprising:
- a device information interface (DII) bus interconnecting said adapters;
- adapter logic at said adapter receiving a channel connect request for initiating a request over said DII bus for status information regarding said another channel;
- virtual device (VDS) memory at said another adapter for storing information relating to the status of said another channel; and,
- adapter logic at said another adapter for decoding said request for status information, addressing said VDS memory, and providing said status information to said DII bus for transmission to said adapter receiving a channel connect request.

11. Apparatus for efficiently interconnecting data channels of a multiprocessor facility comprising:
- a plurality of channel adapters, each adapter connected to a channel, said channel supplying a request from a first device to address a second device associated with another channel connected to another channel adapter;
- adapter logic circuit at each channel adapter, said adapter logic circuit decoding said request at a channel receiving said request, and initiating an inquiry to said associated device for status information over a device interface bus, and determining whether said first and second devices should be connected, said adapter logic circuit at said another channel adapter providing said status information of said device associated with said second connected channel over said device interface bus;
- a microprocessor connected by a control bus to each of said adapters to receive an interrupt from said adapter logic which has determined that said devices should be connected and to receive the identity of said first adapter generating said interrupt and the adapter associated with said second device; and,
- a data bus interconnecting each of said channel adapters through respective multiplexers, a pair of multiplexers being enabled by said microprocessor in response to said interrupt received over said control bus.

12. The apparatus of claim 11, wherein said microprocessor is programmed to:
- establish a link request table in a memory identifying which channel adapters are to be interconnected; and,
- determine in accordance with predetermined criteria, whether said channel adapter issuing an interrupt should have a request entered in said link request table.

13. The apparatus of claim 12, wherein said predetermined criteria includes the absence of a pending entry in said link table requesting connection to only one of said identified channel adapters.

14. The apparatus of claim 12, wherein said microprocessor enters a link request in said link request table when there are no previous pending requests for connection to said another channel adapter, and further supplies over said control bus to said another adapter data indicating said other channel should attempt access to said channel initiating a request.

15. The apparatus of claim 12 wherein said microprocessor determines to enter a link request in said table if a previous request to link said devices has been entered in said ink request table, and said microprocessor forces a retry command to a requesting device.

* * * * *

UNITED STATES PATENT AND TRADEMARK OFFICE
CERTIFICATE OF CORRECTION

PATENT NO. : 5,255,372
DATED : October 19, 1993
INVENTOR(S) : Adrian S. Butter

It is certified that error appears in the above-indentified patent and that said Letters Patent is hereby corrected as shown below:

On the title page, item (54) and column 1, line 2, "interconnecing" should read --interconnecting--.

In column 1, line 17, "described" should be --disclosed--.
In column 11, line 12, "after "and" insert --Y,--.
In column 16, line 41, after "channel" insert --adapter--;
        line 46, "ink" should be --link--.

Signed and Sealed this

Seventh Day of June, 1994

Attest:

BRUCE LEHMAN

Attesting Officer     Commissioner of Patents and Trademarks